(12) United States Patent
Imayama et al.

(10) Patent No.: US 7,978,287 B2
(45) Date of Patent: Jul. 12, 2011

(54) TRANSFLECTIVE LIQUID CRYSTAL DISPLAY DEVICE

(75) Inventors: Hirotaka Imayama, Mobara (JP); Masateru Morimoto, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 97 days.

(21) Appl. No.: 11/907,370

(22) Filed: Oct. 11, 2007

(65) Prior Publication Data

US 2008/0088777 A1 Apr. 17, 2008

(30) Foreign Application Priority Data

Oct. 13, 2006 (JP) ................................. 2006-280192

(51) Int. Cl.
*G02F 1/1335* (2006.01)
(52) U.S. Cl. ....................................................... 349/114
(58) Field of Classification Search .................... 349/114
See application file for complete search history.

(56) References Cited

U.S. PATENT DOCUMENTS

| | | | |
|---|---|---|---|
| 7,027,116 B2 * | 4/2006 | Ohmuro et al. ............... 349/114 |
| 7,212,266 B2 * | 5/2007 | Tashiro et ..................... 349/114 |
| 7,362,400 B2 * | 4/2008 | Itou et al. ...................... 349/141 |
| 7,502,084 B2 * | 3/2009 | Nishimura .................... 349/114 |
| 2004/0189922 A1 * | 9/2004 | Ono et al. ..................... 349/141 |
| 2005/0105034 A1 * | 5/2005 | Ono et al. ..................... 349/143 |
| 2005/0140617 A1 * | 6/2005 | Jang et al. ........................ 345/87 |
| 2006/0279677 A1 * | 12/2006 | Matsushima ................. 349/114 |
| 2008/0088777 A1 * | 4/2008 | Imayama et al. ............. 349/114 |

FOREIGN PATENT DOCUMENTS

JP 2003-344837 5/2002

* cited by examiner

*Primary Examiner* — Charlie Peng
(74) *Attorney, Agent, or Firm* — Stites & Harbison, PLLC; Juan Carlos A. Marquez, Esq (57) ABSTRACT

To improve display quality in a transflective liquid crystal display device.
In a transflective liquid crystal display device based on the IPS system according to the present invention, when a liquid crystal layer is of positive type liquid crystal, the initial orientation direction of liquid crystal in the liquid crystal layer is perpendicular to the direction in which a l-display line extends, or angularly displaced within ±2 degrees clockwise with respect to the direction in which the l-display line extends. When the liquid crystal layer is of negative type liquid crystal, the initial orientation direction of liquid crystal in the liquid crystal layer is parallel to the direction in which the l-display line extends, or angularly displaced within ±2 degrees clockwise with respect to the direction in which the l-display line extends.

9 Claims, 8 Drawing Sheets

TRANSFLECTIVE LIQUID CRYSTAL DISPLAY DEVICE

CLAIM OF PRIORITY

The present application claims priority from Japanese Application JP 2006-280192 filed on Oct. 13, 2006, the content of which is hereby incorporated by reference into this application.

BACKGROUND OF THE INVENTION

1. Field of the Invention

The present invention relates to a transflective liquid crystal display device, and more specifically to a technique effective when applied to a transflective liquid crystal display device based on the IPS (In Plane Switching) system.

2. Description of the Related Art

A transflective liquid crystal display device having a transmissive section and a reflective section within one sub-pixel has been used as a display for a portable device.

In this type of transflective liquid crystal display device, generally the vertical electric field system is used. In this system, an electric field is applied to a liquid crystal held between a pair of substrates in the direction vertical to a substrate plane of the pair of substrates to drive the liquid crystal. Furthermore, to match performance of the transmissive section to that of the reflective section, a step is provided for each of the transmissive section and the reflective section, and in addition a phase difference plate is provided between a polarization plate and a liquid crystal layer.

A liquid crystal device based on the IPS system has been known as a liquid crystal device. In the liquid crystal device based on the IPS system, a pixel electrode (PIX) and a counter electrode (CT) are formed on one substrate, and an electric field is applied to the two electrodes and the liquid crystal is turned on the substrate plane to provide controls over the brightness. Because of the mechanism, this type of liquid crystal device has a feature that contract of the displayed image is not inverted when the screen is viewed in the diagonal direction.

To effectively utilize the feature described above, the technique for configuring a transflective liquid crystal display device with the liquid crystal display device based on the IPS system is proposed, for instance, in JP-A-2003-344837.

Examples of the related art document relating to the present invention includes JP-A-2003-344837.

SUMMARY OF THE INVENTION

The transflective liquid crystal display device based on the IPS system is driven by the l-line inversion system for achieving reduction in power consumption.

For the l-line inversion system, however, a reference voltage (a counter voltage or a common voltage) is applied to respective counter electrodes for one and the other in two display lines adjoining each other. Since the applied reference voltages have the opposite polarity to each other, an electric field is generated between the counter electrode for one of the display lines and that for the other even during the black display mode. Because of the feature, liquid crystal molecules in the liquid crystal layer move in a direction different from the initial orientation direction of the liquid crystal to cause leakage of light at several portions (black-spotted portions), which may sometimes cause degradation of display quality.

The present invention has been made to solve the problems in the related art as described above, and an object of the present invention is to provide a technique enabling improvement of image quality in a transflective liquid crystal display device based on the IPS system.

The above-described and other objects of the present invention will be clarified by referring to descriptions in the present specification as well as to the attached drawings.

Briefly, representative features of the present invention disclosed herein are as described below.

(1) A transflective liquid crystal display device comprises a liquid crystal display panel including a pair of substrates and a liquid crystal layer held between the pair of substrates, the liquid crystal display panel having a plurality of sub-pixels each having a transmissive section and a reflective section, each of the sub-pixels having a counter electrode formed over one of the pair of substrates and a pixel electrode formed over the one of the pair of the substrates, the counter electrode and the pixel electrode generating an electric field to drive a liquid crystal in the liquid crystal layer, wherein the liquid crystal layer is of positive type liquid crystal, and the initial orientation direction of the liquid crystal in the liquid crystal layer is perpendicular to the direction in which a l-display line extends or angularly displaced within ±2 degrees clockwise with respect to the direction perpendicular to the direction in which the l-display line extends.

(2) A transflective liquid crystal display device comprising a liquid crystal display panel including a pair of substrates and a liquid crystal layer held between the pair of substrates, the liquid crystal display panel having a plurality of sub-pixels each having a transmissive section and a reflective section, each of the sub-pixels having a counter electrode formed over one of the pair of substrates and a pixel electrode formed over the one of the pair of the substrates, the counter electrode and the pixel electrode generating an electric field to drive a liquid crystal in the liquid crystal layer, wherein the liquid crystal layer is of negative type liquid crystal, and the initial orientation direction of the liquid crystal in the liquid crystal layer is parallel to the direction in which a l-display line extends or angularly displaced within ±2 degrees with respect to the direction in which the l-display line extends.

(3) In (1) or (2) above, the counter electrode is a planar electrode; the pixel electrode is an electrode having a plurality of linear portions; the pixel electrode is formed over the counter electrode on the side where the one of the substrates is disposed; and the direction in which the l-display line extends diagonally crosses the direction in which the linear portions of the pixel electrode extend.

(4) In (1) or (2) above, the pixel electrode is a planar electrode; the counter electrode is an electrode having a plurality of linear portions; the counter electrode is formed over the pixel electrode on the side where the one of the substrates is disposed; and the direction in which the l-display line extends diagonally crosses the direction in which the linear portions of the counter electrode extend.

(5) In (3) or (4) above, the plurality of linear portions are provided in the transmissive section and the reflective section respectively.

(6) In any of (1) to (5) above, the counter electrode is provided for each display line.

(7) In any of (1) to (6) above, a phase difference plate and a step forming layer are provided in the reflective section.

(8) In (7) above, assuming that adjoining two display lines form a pair of one display line and the other display line, the reflective section of the one display line adjoins the reflective section of the other display line; and the phase difference plate and the step forming layer are provided to extend over an area ranging from the counter electrode on the one display line to the counter electrode on the other display line when viewed from the top.

(9) In any of (1) to (8), a light-shielding film is formed on the other substrate of the pair of substrates; and the light-shielding film is not formed in a boarder area between sub-pixels adjoining each other in the direction perpendicular to the direction in which the l-display line extends when viewed from the top.

Representative effects provided by the present invention disclosed herein are as described below briefly.

With the present invention, it is possible to improve display quality in a transflective liquid crystal display device based on the IPS system.

DETAILED DESCRIPTION OF THE PREFERRED EMBODIMENTS

Embodiments of the present invention will be described in detail below with reference to the drawings. In the drawings used for illustrating embodiments of the present invention, parts having the same function are assigned the same reference numerals, and repetitive description thereof will be omitted.

First Embodiment

Figure 1:
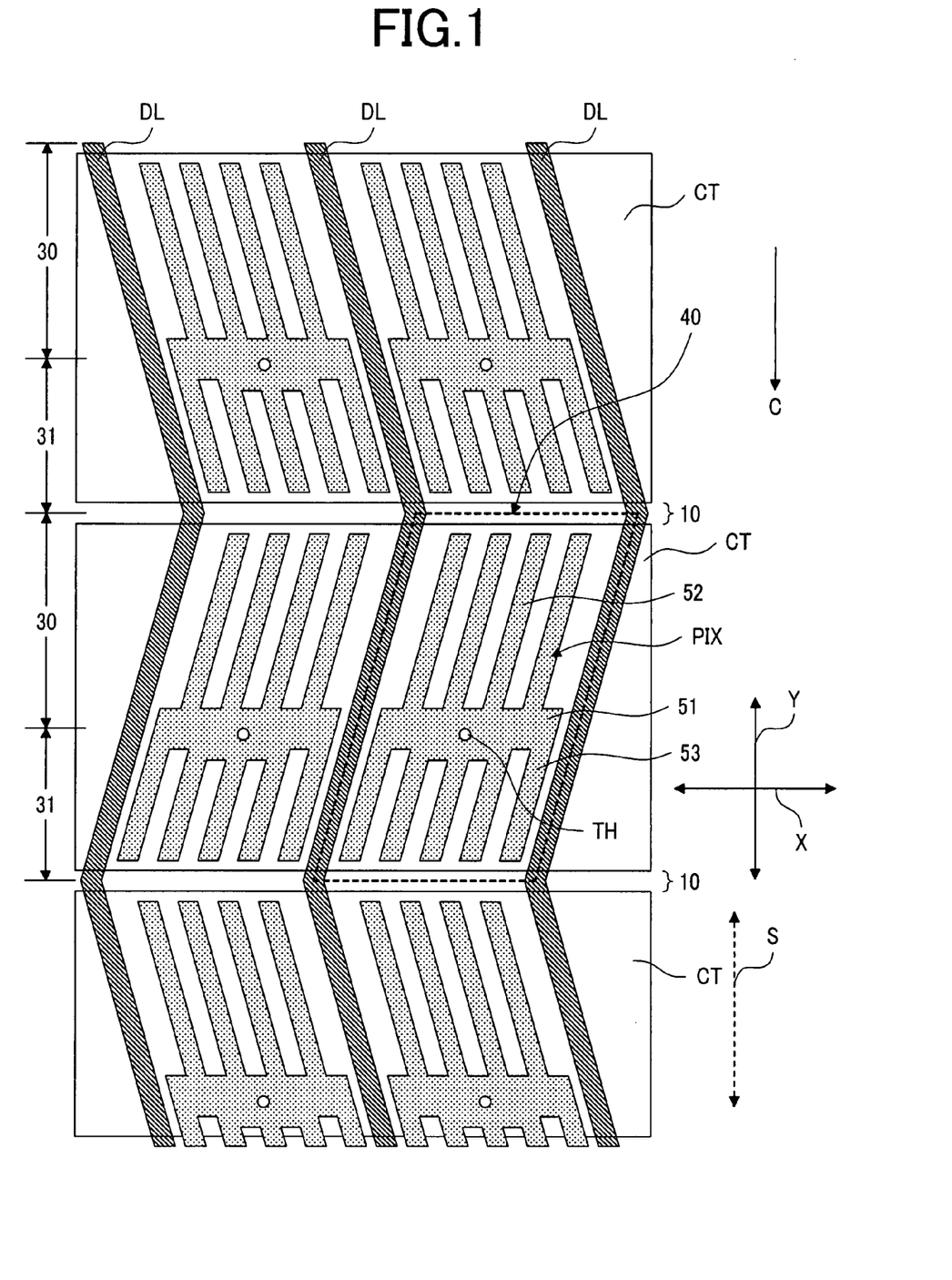
FIG. 1 is a plan view illustrating an electrode structure in the side where a TFT substrate included in a liquid crystal display panel is disposed in a transflective liquid crystal display device according to a first embodiment of the present invention.
Figure 2A:
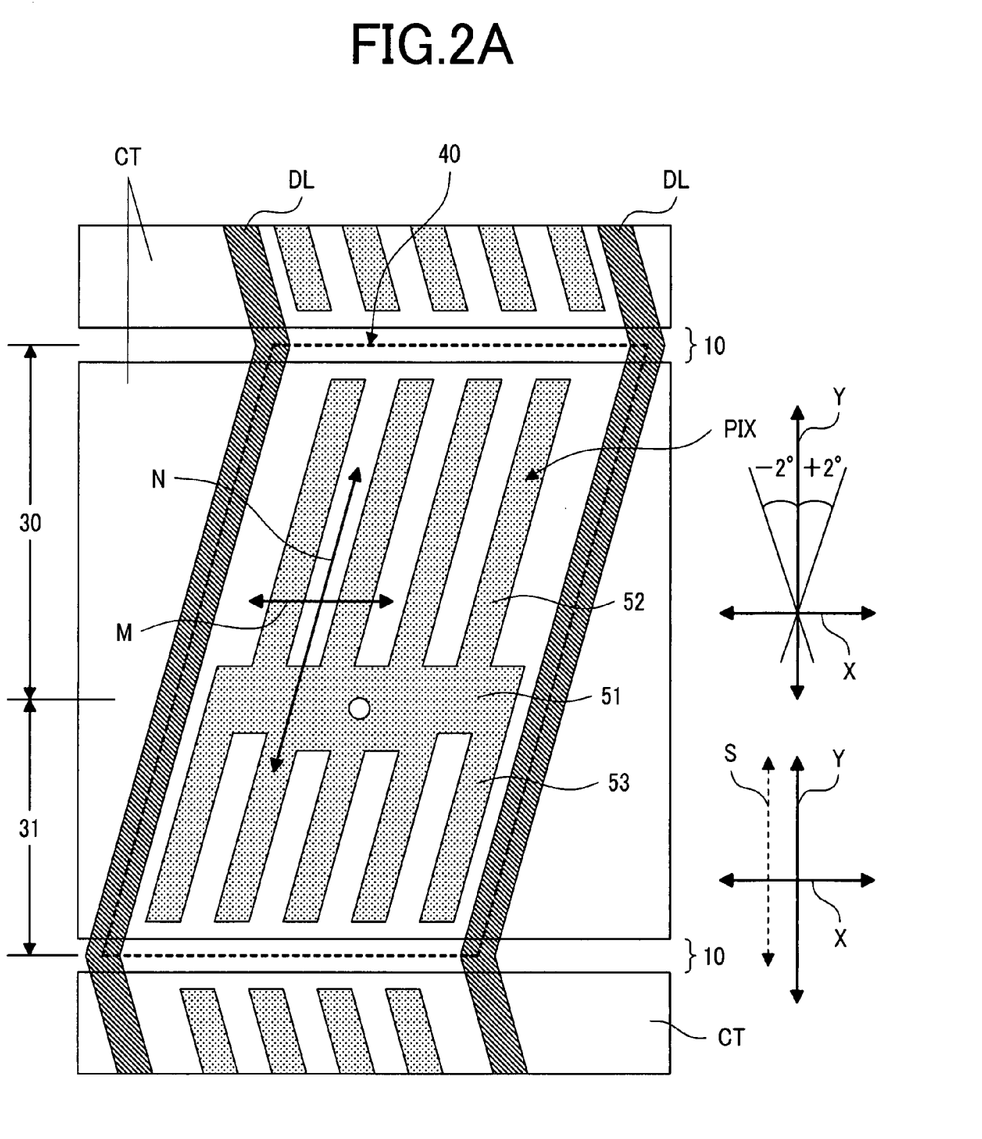
FIG. 2A is a view illustrating a portion of FIG. 1 in the enlarged state, and illustrates a relation between an initial orientation direction of liquid crystal when the liquid crystal is of the positive type and the direction in which a l-display line extends.
Figure 2B:
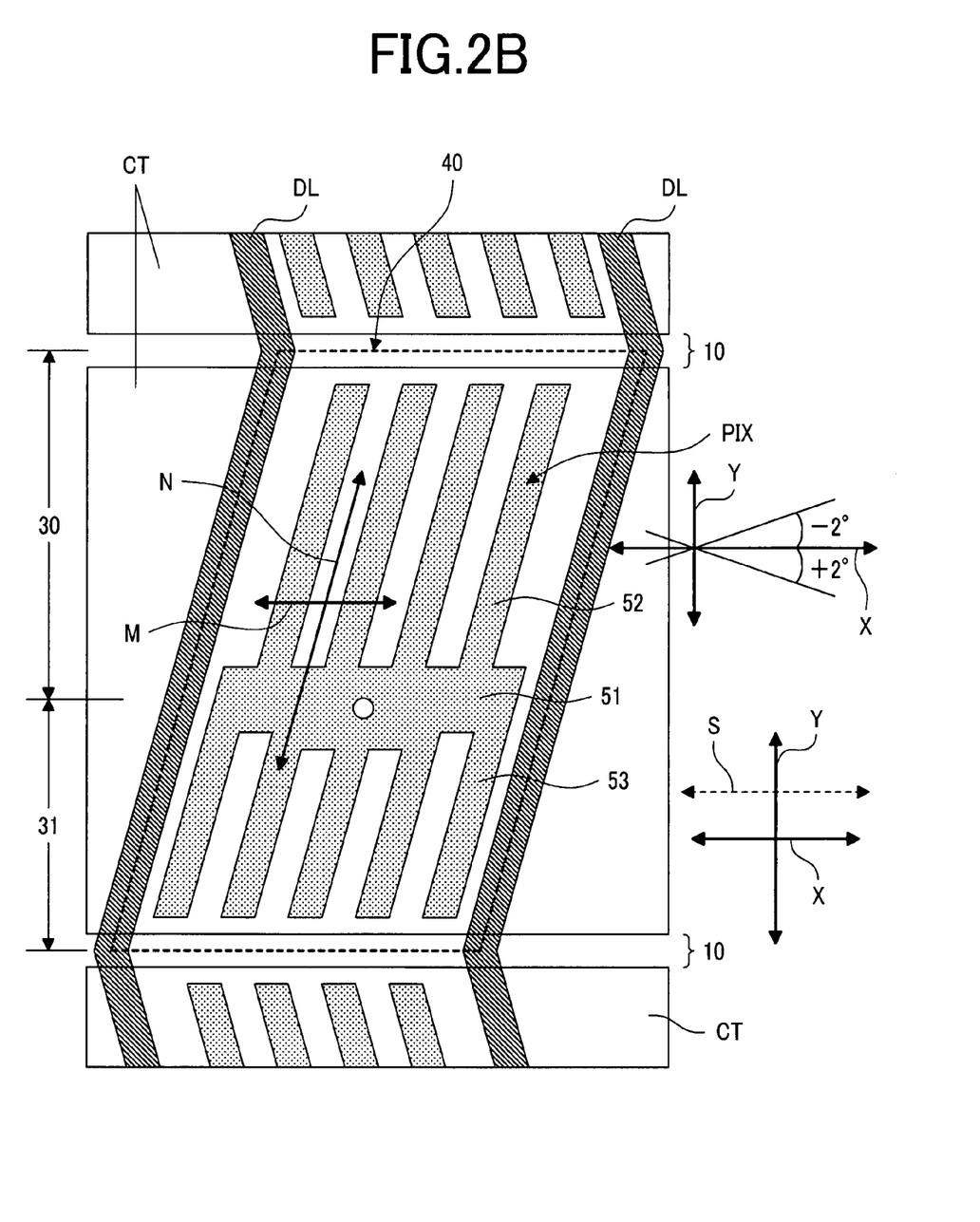
FIG. 2B is a view illustrating a portion of FIG. 1 in the enlarged state, and illustrates a relation between an initial orientation direction of liquid crystal when the liquid crystal is of the negative type and the direction in which a l-display line extends.
Figure 3:
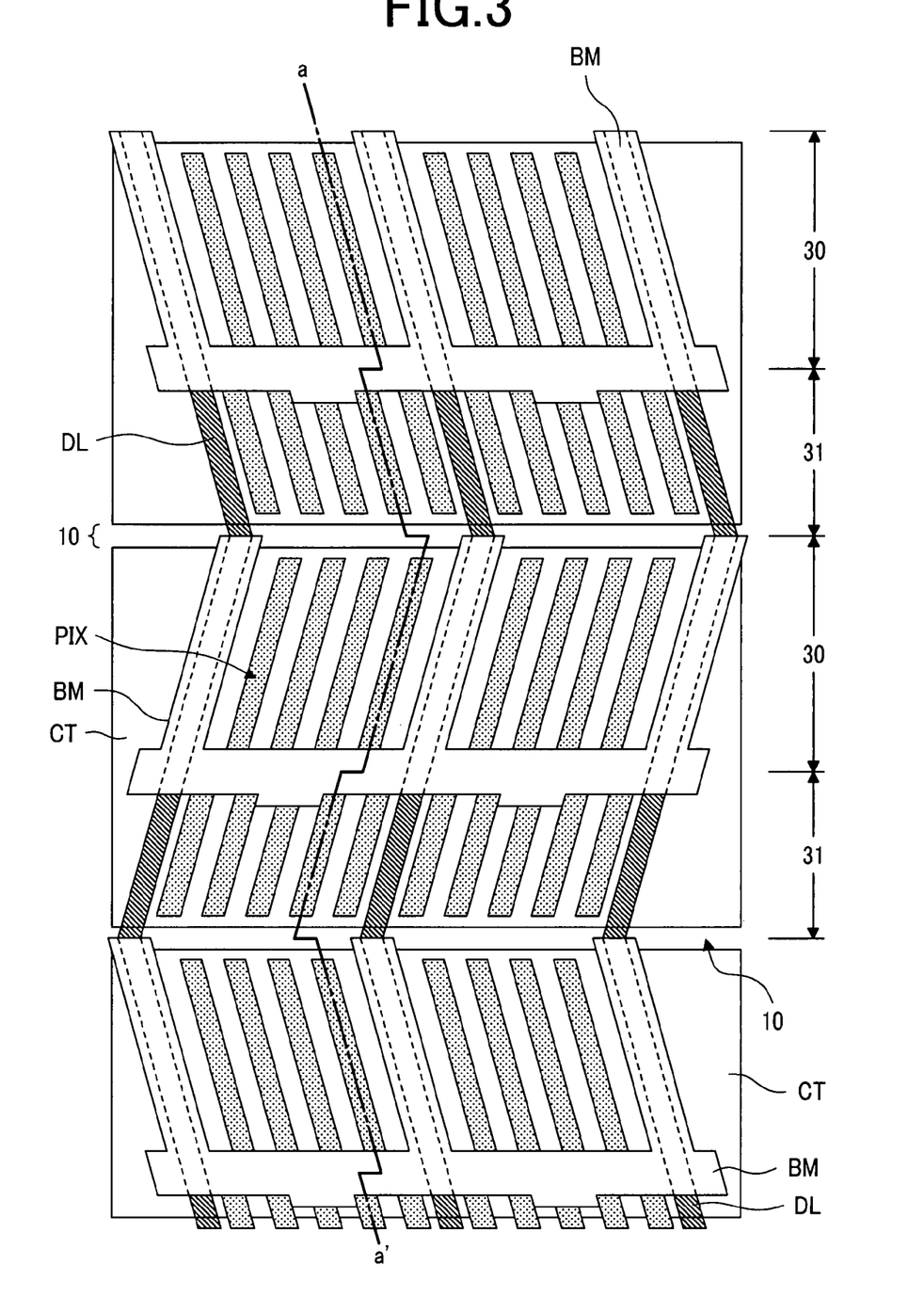
FIG. 3 is a plan view illustrating a state in which a light-shielding film in the CF substrate side is overlaid on the electrode structure shown in FIG. 1.
Figure 4:
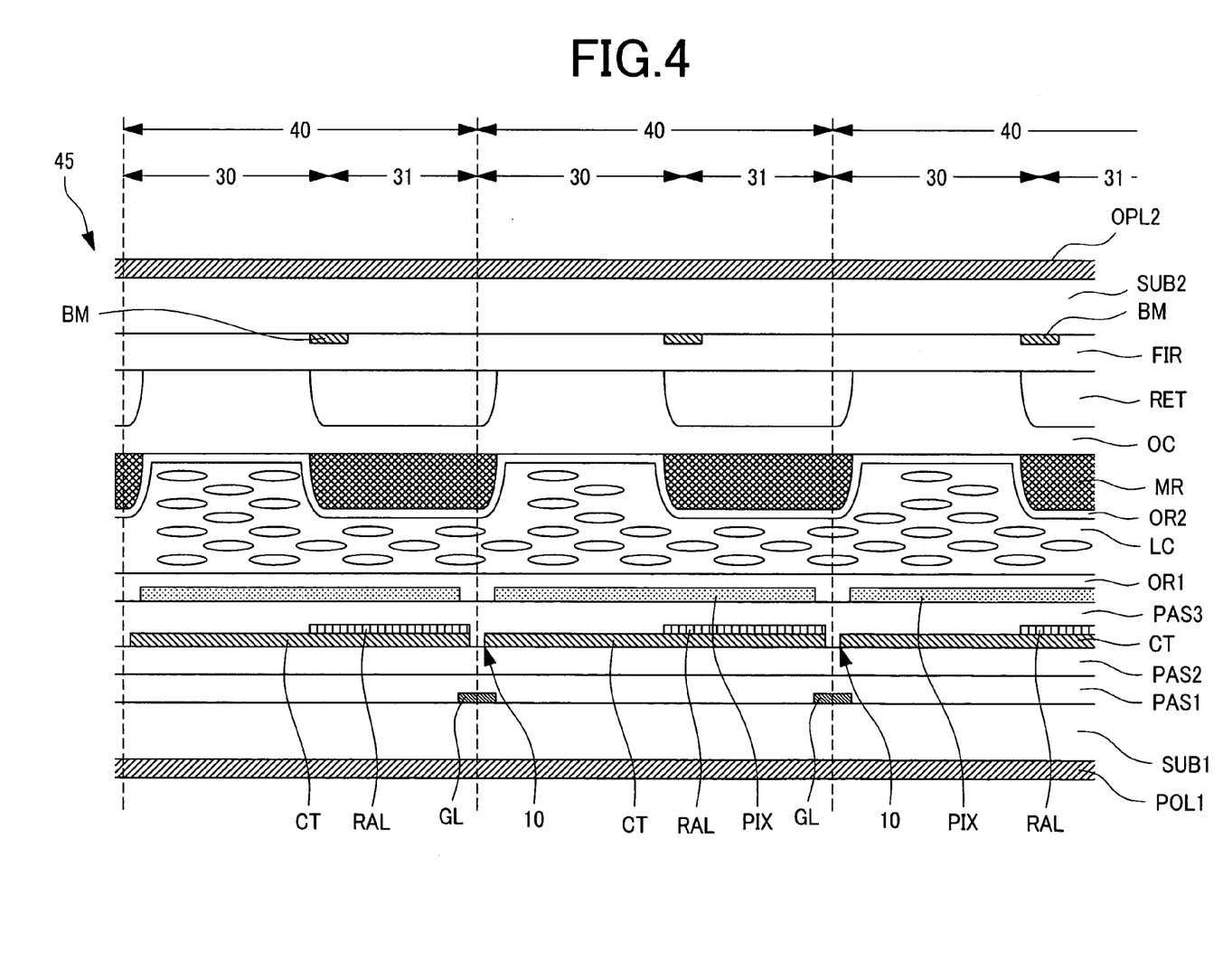
FIG. 4 is a cross-sectional view illustrating a cross-sectional structure taken along the line a-a' in FIG. 3.

FIGS. 1 to 4 are views each illustrating a transflective liquid crystal display device based on the IPS system according to a first embodiment of the present invention. FIG. 1 is a plan view illustrating a structure of an electrode on the side where a TFT substrate included in a liquid crystal panel is disposed in the transflective liquid crystal display device. FIG. 2A is a plan view illustrating a portion of FIG. 1 in the enlarged form, namely illustrating a relation between the initial orientation direction of a liquid crystal and a direction in which a l-display line extends when a positive type liquid crystal is used. FIG. 2B is a plan view illustrating a portion of FIG. 1 in the enlarged form, namely illustrating a relation between the initial orientation direction of a liquid crystal and a direction in which a l-display line extends when a negative type liquid crystal is used. FIG. 3 is a plan view illustrating the state in which a light-shuttering film on the CF substrate is overlaid on electrode structure shown in FIG. 1. FIG. 4 is a cross-sectional view illustrating a cross-sectional structure taken along the line a-a' in FIG. 3.

The liquid crystal display device based on the IPS system according to the first embodiment includes a liquid crystal display panel 45 shown in FIG. 4. The liquid crystal display panel 45 has a structure in which a liquid crystal layer (LC) comprising a number of liquid crystal molecules is held between a pair of glass substrates (SUB1, SUB2) as shown in FIG. 4, and a main surface of the glass substrate (SUB2) is used for observation. Furthermore, the liquid crystal display panel 45 has a plurality of sub-pixels 40. Each of the sub-pixels 40 has a pixel electrode (PIX) and a counter electrode (CT; also referred to as common electrode), having a transmissive section 30 and a reflective section 31.

Referring to FIG. 1, a first direction is referred to as direction X, and a second direction perpendicular to the first direction (direction X) is referred to as direction Y when the liquid crystal display panel 45 is viewed from the top.

The sub-pixels 40 are arrayed in the matrix-like state (m rows×n columns). For instance, in the case of a liquid crystal display panel for color displays used in a mobile telephone, 240×320×3 sub-pixels are arrayed in the matrix state.

The transmissive section 30 constitutes a transmissive liquid crystal display panel, while the reflective section 31 constitutes a reflective liquid crystal display panel.

The sub-pixels 40 arrayed in the X direction form a l-display line, and a plurality of the l-display lines are provided in the Y direction.

The arrow C in FIG. 1 indicates the scanning direction.

As shown in FIG. 4, a light-shielding film (BM: black matrix), a color filter layer (FIR), a phase difference plate (½ wavelength plate) for changing a light polarization state (RET), a protection film (OC), a step forming layer (MR), and an orientational film (OR2) are formed in the side of the liquid crystal layer included in the glass substrate (SUB2; also referred to as "CF substrate) from the glass substrate (SUB2) toward the liquid crystal layer (LC). A polarizing plate is provided in the outer side opposite the side of the liquid crystal layer included in the glass substrate (SUB2).

A scan line (GL, also referred to as gate line), an insulating film (PAS1), an insulating film (PAS2), the counter electrode (CT), a reflection electrode (RAL), an insulating film (PAS3), the pixel electrode (PIX), and an orientational film (OR1) are formed in the side of the liquid crystal layer included in the glass substrate (SUB1, also referred to as TFT substrate) from the glass substrate (SUB1) toward the liquid crystal layer (LC). A polarizing plate (POL1) is provided in the outer side opposite the side of the liquid crystal layer included in the glass substrate (SUB1).

Although not shown in FIG. 4, the image lines (DL; also referred to as source line or drain line) as shown in FIG. 1 are formed between the insulating film (PAS1) and the insulating film (PAS2). The image line (DL) extends in the zig-zag state for each display line in the Y direction as shown in FIG. 1, while the scan line (GL) linearly extends in the X direction although not shown in detail in the figure.

Furthermore, an active matrix is comprised of a plurality of scan lines (GL), a plurality of image lines (DL), and thin-film transistors (TFT, an active device) each formed in association with each sub-pixel 40, although not shown in the figure.

As shown in FIG. 4, the pixel electrode (PIX) is formed over the counter electrode (CT) on the side where the glass substrate (SUB1) is provided. The pixel electrode (PIX) and the counter electrode (CT) are superposed through the insulating film (PAS3). This allows a holding capacity to be formed. Each of the pixel electrode (PIX) and the counter electrode (CT) is made of a transparent conductive film such as ITO (Indium Tin Oxide)

The reflective section 31 has a reflection electrode (RAL). In the first embodiment 1, the reflection electrode (RAL) is composed of a metallic film having a monolayer structure made of an aluminum (Al), or of a two-layered metallic film having a lower layer made of molybdenum and an upper layer made of aluminum (Al). The reflection electrode (RAL) is formed on the counter electrode (CT) in the reflective section 31.

The phase difference plate (RET) and the step forming layer (MR) are provided in association with the reflective section 31. The step forming layer (MR) is provided to adjust a cell gap length (d) of the liquid crystal layer (LC) included in the reflective section 31 so that a light path length of light in the reflective section 31 is equivalent to a light path length of a λ/4 wavelength plate. The phase difference plate (RET) is used to prevent contrast between the transmissive section 30 and the reflective section 31 from being reversed. The phase difference plate (RET) is formed, for instance, with a ½ wavelength plate in the first embodiment.

The counter electrode (CT) has a planar form as shown in FIG. 1. The counter electrode (CT) is formed for each 1-display line. The counter electrode (CT) extends in the X direction as the display line does, and is common for each 1-display line. In two display lines adjoining each other, a gap 10 is provided between a counter electrode (CT) for one display line and that for the other display line. A gap 10 is provided between the counter electrodes (CTs) for one and the other in two the display lines adjoining each other.

The pixel electrode (PIX) has a comb-shaped electrode structure as shown in FIG. 1. The comb-shaped electrode structure includes a coupling section 51, a plurality of comb-shaped electrode portions (linear portions) 52, and a plurality of comb-shaped electrode portions (linear portions) 53. The coupling section 51 extends in the X direction when viewed from the top. The plurality of comb-shaped electrode portions (linear portions) 52 extend from this coupling section 51 in the Y direction toward the transmissive section 30 with a predetermined gap provided in the X direction. A plurality of comb-shaped electrode portions (linear portions) 53 extend from the coupling section 51 in the Y direction toward the reflective section 31 with a predetermined interval provided in the X direction.

In the first embodiment, the comb-shaped portions (52, 53) are described as a portion of the pixel electrode (PIX), but sometimes the comb-shaped portions (52, 53) are referred to as a pixel electrode.

In the pixel electrode (PIX), the comb-shaped portions 52 of the transmissive section 30 and the comb-shaped portions 53 of the reflective section 31 are formed with the substantially same width and gap provided, but the number of the comb-shaped electrode portions 53 of the reflective section 31 is larger than that of the comb-shaped electrode portions of the transmissive section 30.

An image voltage is applied to the pixel electrode (PIX) from the image line (DL) via a thin film transistor (TFT) having a semiconductor layer (poly-si) and a through-hole (TH). This through-hole (TH) is filled with a metal such as aluminum (Al).

The transflective liquid crystal display device based on the IPS system is driven by the 1-line inversion system for reduction of power consumption.

Referring to FIG. 1, however, for the 1-line inversion system, however, a reference voltage (a counter voltage or a common voltage) is applied to respective counter electrodes (CT) for one and the other in two display lines adjoining each other. Since the applied reference voltages have the opposite polarity to each other, an electric field is generated between the counter electrode (CT) for one of the display lines and that for the other even during the black display mode. Because of the feature, liquid crystal molecules in the liquid crystal layer (LC) move in a direction different from the initial orientation direction (S) of the liquid crystal to cause leakage of light at several portions (black-spotted portions), which may sometimes cause degradation of display quality.

To overcome this problem, there is the need for controlling the initial orientation direction (S) of liquid crystal molecules in the liquid crystal (LC) layer so that the liquid crystal molecules in the liquid crystal (LC) layer will not move even when an electric field is generated between a counter electrode (CT) for one display line and that for the other display line. More specifically, the technique used for achieving the object described above varies according to a type of the liquid crystal (LC) layer.

In the case where a liquid crystal (LC) layer is of a positive type, as shown in FIG. 2A, the initial orientation direction (S) of a liquid crystal in the liquid crystal (LC) layer is set in a direction perpendicular to the direction (X direction) in which the 1-display line extends or angularly displaced within ±2 degrees in the clockwise direction with respect to the direction (Y direction) perpendicular to the direction in which the 1-display line extends (X direction). This means that an orientation of a magnetic field generated between a counter electrode (CT) for one display line and that for the other display line coincides with the initial orientation direction (S) of liquid crystal molecules in the liquid crystal (LC) layer, and therefore even when leakage of an electric field occurs during black display, leakage of light does not occur. Because of the characteristics, it is possible to improve image quality in the transflective liquid crystal display device based on the IPS system.

When the liquid crystal (LC) layer is of a negative type, the initial orientation direction (S) of liquid crystal molecules in the liquid crystal (LC) layer is set in a direction parallel to the direction in which the 1-display line extends (X direction) or angularly displaced within ±2 degrees in the clockwise direction with respect to the direction in which the 1-display line extends (X direction) as shown in FIG. 2B. Also in this case, even when leakage of an electric field to the transmissive section 30 occurs during black display, liquid crystal molecules in the transmissive section 30 do not move, so that leakage of light (gray display) never occurs. Because of the features as described above, it is possible to improve image quality in the transflective liquid crystal display device based on the IPS system.

On the other hand, an electric field is generated by the pixel electrode (PIX) and the counter electrode (CT) to realize white display, it is required to generate an electric field in a direction different from the initial orientation direction (S) of liquid crystal molecules in the liquid crystal (LC) layer in main portions of the display. To satisfy this requirement, the following two directions are changed: the direction in which the pixel electrode (PIX) extends and the initial orientation direction (S) of liquid crystal molecules in the liquid crystal (LC) layer.

Whether liquid crystal molecules rotate in response to an electric field generated between the counter electrode (CT) and the pixel electrode (PIX) depends on the relation between the initial orientation direction (S) of liquid crystal molecules and a direction (M) perpendicular to the direction (N) in which the comb-shaped pixel electrode (PIX) extends, because the electric field has an orientation in the direction (M).

In the first embodiment, in the case where a negative type of liquid crystal is used and also in the case where a positive type of liquid crystal is used, the direction in which the l-display line extends (X direction) and the direction (N) in which linear portions (52, 53) of the pixel electrode (PIX) extend are not parallel or not perpendicular to each other, but cross each other diagonally as shown in FIGS. 2A and 2B.

As shown in FIG. 1, in two display lines adjoining each other, the direction (N) in which a pixel electrode (PIX) for one display line extends and the direction (N) in which a pixel electrode (PIX) for the other display line extends are in line symmetry with respect to the gap 10. The gap 10 is defined between a counter electrode (CT) for the one display line and a counter electrode (CT) for the other display electrode. More specifically, sub-pixels each with the pixel electrode (PIX) extending in the direction (N) inclined by, for instance, +15 degrees clockwise with respect to the initial orientation direction (S) of liquid crystal molecules and sub-pixels 40 each with the pixel electrode (PIX) extending in the direction (N) inclined by, for instance, −15 degrees clockwise with respect to the initial orientation direction (S) of liquid crystal molecules coexist and are provided alternately line by line. Because of the configuration as described above, an array of sub-pixels may assume a matrix-form when viewed from a panel.

A plurality of display lines in the liquid crystal display panel 45 are arrayed so that, in two display lines adjoining each other, the transmissive section (or the reflective section 31) for one display line and the reflective section 31 (or the transmissive section 30) for the other display line face each other.

Leakage of light occurs, in two display lines adjoining to each other, due to inverse polarities of a reference voltage applied to a counter electrode (CT) for one display line and that applied to a counter electrode (CT) for the other display line. Such leakage can be suppressed by covering the gap 10 between the counter electrode (CT) for one display line and the counter electrode (CT) for the other display line with the light-shielding film (BM). In this case, however, the aperture ratio becomes lower.

In contrast, according to the method which is possible to control and adjust the initial orientation direction (S) of liquid crystal molecules in the liquid crystal (LC) layer to prevent liquid crystal molecules in the liquid crystal (LC) layer from moving even when an electric field is generated between a counter electrode (CT) for one display line and a counter electrode (CT) for the other display line, it is not necessary to cover the gap 10 between the counter electrode (CT) for the one display line and that for the other display line. Thus it is possible to suppress leakage of light without lowering the aperture ratio.

In the first embodiment of the present invention, when viewed from the top, the light-shielding film (BM) is not formed over the gap 10 between a counter electrode (CT) for one in two display lines adjoining each other and that (CT) for the other as shown in FIG. 3. In other words, the light-shielding film (BM) is not formed in the border area between the sub-pixels 40 adjoining each other in the direction (Y direction) perpendicular to the direction (X direction) in which the l-display line extends. When it is necessary to cover the image line (DL) with the light-shielding film (BM), the gap 10 is covered with the light-shielding film (BM) only in a portion where the image line (DL) crosses the l-display line.

Second Embodiment

Figure 5:
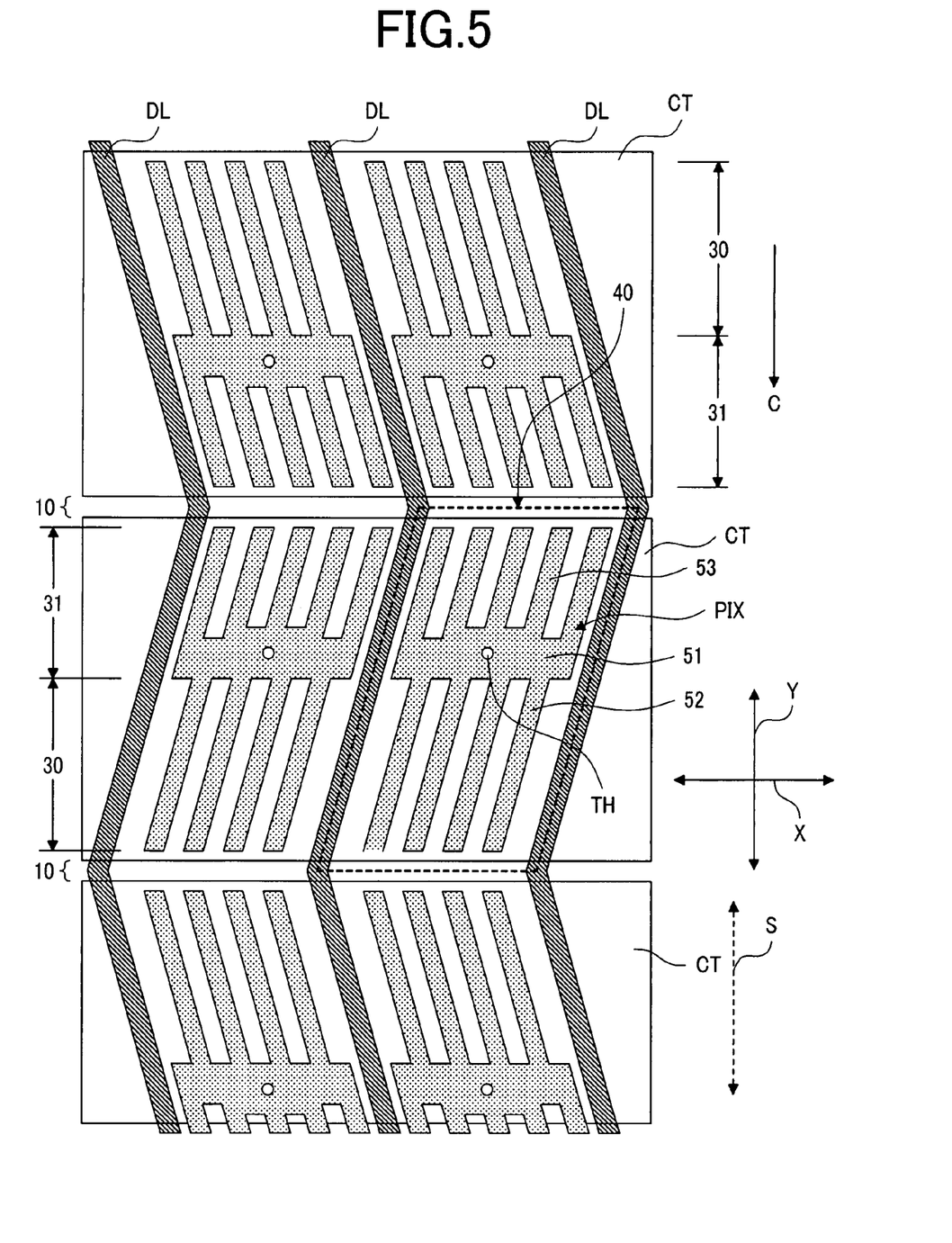
FIG. 5 is a plan view illustrating an electrode structure in the side where a TFT substrate included in a liquid crystal display panel is disposed in a transflective liquid crystal display device according to a second embodiment of the present invention.
Figure 6:
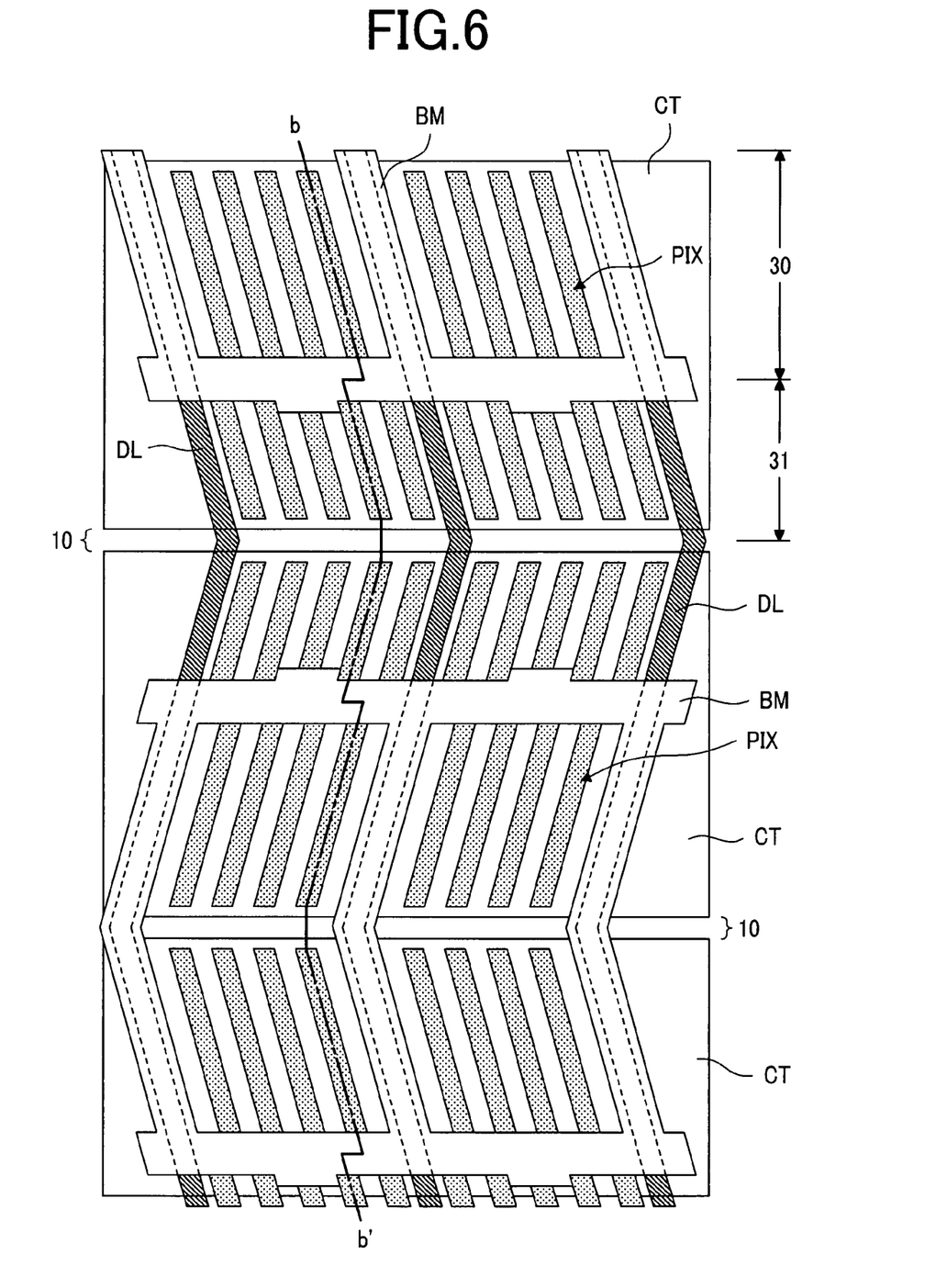
FIG. 6 is a plan view illustrating a state in which a light-shielding film in the CF substrate side is overlaid on the electrode structure shown in FIG. 5.
Figure 7:
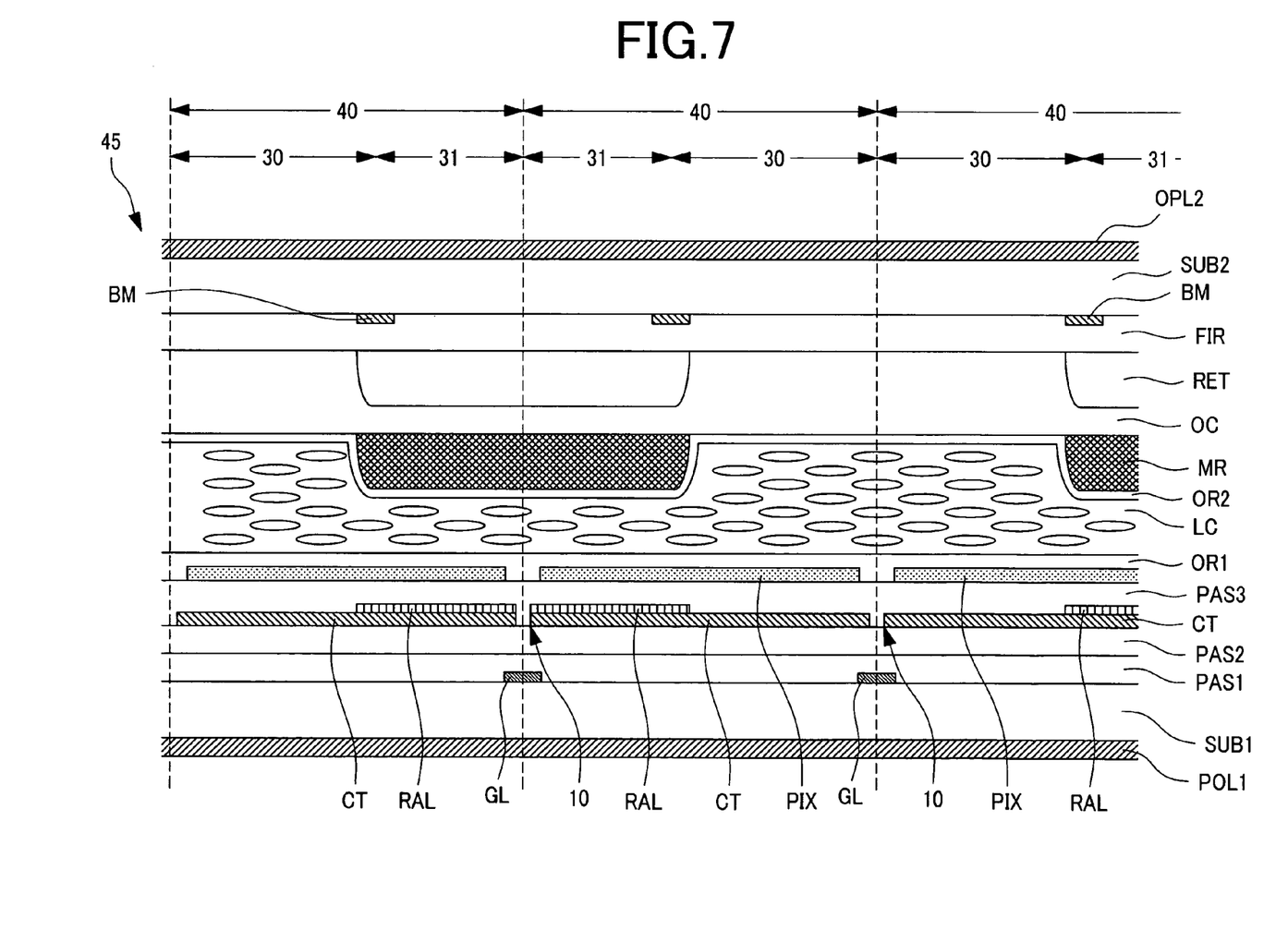
FIG. 7 is a cross-sectional view illustrating a cross-sectional structure along the line b-b' in FIG. 6.

FIGS. 5 to 7 are views each illustrating a transflective liquid crystal display device based on the IPS system according to a second embodiment of the present invention. FIG. 5 is a plan view illustrating an electrode structure in the side where a TFT substrate included in a liquid crystal display panel is disposed in a transflective liquid crystal display device. FIG. 6 is a plan view illustrating a state in which a light-shielding film in the CF substrate side is overlaid on the electrode structure shown in FIG. 5. FIG. 7 is a cross-sectional view illustrating a cross-sectional structure along the line b-b' in FIG. 6

The transflective liquid crystal display device based on the IPS system according to the second embodiment has basically the same configuration as that described in the first embodiment above excluding the following points.

In the first embodiment, when one and the other in two display lines adjoining each other are referred to, the transmissive section 30 (or the reflective section 31) for one display line and the reflective section 31 (or the transmissive section 30) for the other display line are adapted to face each other as shown in FIGS. 1, 3, and 4.

In contrast, in the second embodiment, when one and the other in two display lines adjoining each other are referred to, the reflective section 31 (or the transmissive section 30) for one display line adjoins the reflective section 31 (or the transmissive section 30) for the other display line as shown in FIGS. 5, 6, and 7. Further the phase difference plate (RET) and the step-forming layer (MR) are provided to extend over the gap 10 between the counter electrode (CT) for the one display line and that for the other display line when viewed from the top.

With the configuration as described above, an unuseful area which would be otherwise formed by an inclined portion for the phase difference plate (RET) and the step forming layer (MR) can be reduced and the aperture ration can be improved.

The invention made by the inventor was described above with reference to the embodiments above, but the present invention is not limited to the embodiments, and it is needless to say that various changes and modifications are possible without departing from the gist of the present invention.

For instance, in the first and second embodiments, the pixel electrode (PIX) is arranged at a higher position than the counter electrode (CT) on the side where the TFT substrate is disposed, but the present invention is not limited to the configuration described above. The counter electrode (CT) may be arranged at a higher position than the pixel electrode (PIX) on the side where the TFT substrate is disposed. When viewed from the top, the counter electrode (CT) has a form in which a plurality of linear portions are arranged with a predetermined interval defined, while the pixel electrode (PIX) has a flat form.

What is claimed is:

1. A transflective liquid crystal display device, comprising:
  a liquid crystal display panel including a pair of substrates and a liquid crystal layer held between the pair of substrates, the liquid crystal display panel having a plurality of sub-pixels each having a transmissive section and a reflective section, each of the sub-pixels having a first electrode of a first electrode type formed over one of the pair of substrates and a second electrode of a second electrode type formed over the one of the pair of the substrates, wherein the first electrode of the first electrode type is a planar electrode extending in a direction of a scan line, the second electrode is an electrode having a plurality of linear portions, and an insulating layer is disposed between the first electrode and the second electrode, a third electrode of the first electrode type extending in the direction of the scan line is located in a direction that is perpendicular to the direction of the scan line from the first electrode such that a gap exists between the first and third electrodes;

a voltage applied to the first electrode is different from a voltage applied to the third electrode, the first electrode and the second electrode generate an electric field to drive a liquid crystal in the liquid crystal layer, the liquid crystal layer is of a positive type liquid crystal, an initial orientation direction of the liquid crystal in the liquid crystal layer is perpendicular to the direction in which the scan line extends or is angularly displaced within ±2 degrees clockwise with respect to the direction perpendicular to the direction in which the scan line extends, and the initial orientation direction of the liquid crystal in the liquid crystal layer forms an oblique angle with a direction of the linear portions of the second electrode.

2. The transflective liquid crystal display device according to claim 1, wherein the first electrode is a counter electrode, and the second electrode is a pixel electrode.

3. The transflective liquid crystal display device according to claim 1, wherein the first electrode is a pixel electrode, and the second electrode is a counter electrode.

4. The transflective liquid crystal display device according to claim 2, wherein the plurality of linear portions are provided in the transmissive section and the reflective section respectively.

5. The transflective liquid crystal display device according to claim 3, wherein the plurality of linear portions are provided in the transmissive section and the reflective section respectively.

6. The transflective liquid crystal display device according to claim 1, wherein a phase difference plate and a step forming layer are provided in the reflective section.

7. The transflective liquid crystal display device according to claim 6, wherein, adjoining two display lines form a pair of one display line and the other display line, the reflective section of the one display line adjoins the reflective section of the other display line; and the phase difference plate and the step forming layer are provided to extend over an area ranging from the counter electrode on the one display line to the counter electrode on the other display line when viewed from the top.

8. The transflective liquid crystal display device according to claim 1, wherein a light-shielding film is formed on the other substrate of the pair of substrates; and the light-shielding film is not formed in a border area between sub-pixels adjoining each other in the direction perpendicular to the direction in which the scan line extends when viewed from the top.

9. A transflective liquid crystal display device, comprising:

a liquid crystal display panel including a pair of substrates and a liquid crystal layer held between the pair of substrates, the liquid crystal display panel having a plurality of sub-pixels each having a transmissive section and a reflective section, each of the sub-pixels having a first electrode of a first electrode type formed over one of the pair of substrates and a second electrode of a second electrode type formed over the one of the pair of the substrates, wherein the first electrode of the first electrode type is a planar electrode extending in a direction of a scan line, the second electrode is an electrode having a plurality of linear portions, and an insulating layer is disposed between the first electrode and the second electrode, a third electrode of the first electrode type extending in the direction of the scan line is located in a direction that is perpendicular to the direction of the scan line from the first electrode such that a gap exists between the first and third electrodes, a voltage applied to the first electrode is different from a voltage applied to the third electrode, the first electrode and the second electrode generate an electric field to drive a liquid crystal in the liquid crystal layer, the liquid crystal layer is of a negative type liquid crystal, an initial orientation direction of the liquid crystal in the liquid crystal layer is parallel to the direction in which the scan line extends or is angularly displaced within ±2 degrees with respect to the direction in which the scan line extends, and the initial orientation direction of the liquid crystal in the liquid crystal layer forms an oblique angle with a direction of the linear portions of the second electrode.

* * * * *